(12) United States Patent
Andrews et al.

(10) Patent No.: US 12,073,233 B2
(45) Date of Patent: Aug. 27, 2024

(54) SYSTEMS AND METHODS FOR CONFIGURING SETTINGS OF AN IHS (INFORMATION HANDLING SYSTEM)

(71) Applicant: Dell Products, L.P., Round Rock, TX (US)

(72) Inventors: Carlton A. Andrews, Austin, TX (US); Joseph Kozlowski, Broken Arrow, OK (US); David Konetski, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 330 days.

(21) Appl. No.: 17/648,033

(22) Filed: Jan. 14, 2022

(65) Prior Publication Data

US 2023/0229458 A1 Jul. 20, 2023

(51) Int. Cl.
*G06F 9/445* (2018.01)
*G06F 9/4401* (2018.01)
*G06F 9/50* (2006.01)
*H04L 9/40* (2022.01)

(52) U.S. Cl.
CPC .......... *G06F 9/4451* (2013.01); *G06F 9/4403* (2013.01); *G06F 9/44505* (2013.01); *G06F 9/44536* (2013.01); *G06F 9/50* (2013.01); *H04L 63/08* (2013.01)

(58) Field of Classification Search
CPC .. G06F 9/4451; G06F 9/4403; G06F 9/44505; G06F 9/44536; G06F 9/50; H04L 63/08
See application file for complete search history.

(56) References Cited

U.S. PATENT DOCUMENTS

| | | | | |
|---|---|---|---|---|
| 2013/0091499 | A1* | 4/2013 | Soundararajan | G06F 9/45558 718/1 |
| 2022/0012032 | A1* | 1/2022 | Johari | G06F 9/44505 |
| 2022/0171853 | A1* | 6/2022 | Andrews | G06F 21/6218 |
| 2023/0008885 | A1* | 1/2023 | Khatri | G06F 21/602 |
| 2023/0009032 | A1* | 1/2023 | Khatri | G06Q 30/0645 |
| 2023/0130256 | A1* | 4/2023 | Savage | H04L 9/0894 713/156 |

* cited by examiner

*Primary Examiner* — Glenn A. Auve
(74) *Attorney, Agent, or Firm* — Fogarty LLP

(57) ABSTRACT

Systems and methods are provided that support configuration of settings of an Information Handling System (IHS), such as by external configuration tools that are delegated authority to configure any portion of the configurable settings of IHS. During factory provisioning of the IHS, an inventory of configurable settings of the IHS is generated and permissions are assigned for configuration of a portion of the configurable IHS settings by a configuration tool. During the factory provisioning, credentials are stored to the IHS for authenticating communications from the assigned configuration tool. Once the IHS has been delivered and deployed, configuration of the assigned portion of IHS is allowed when configuration requests from the assigned configuration tool are successfully validated against the credentials stored to the IHS during factory provisioning. The configurable settings of the IHS may include BIOS settings, operating system settings and settings supported by hardware components of the IHS.

20 Claims, 6 Drawing Sheets

SYSTEMS AND METHODS FOR CONFIGURING SETTINGS OF AN IHS (INFORMATION HANDLING SYSTEM)

FIELD

This disclosure relates generally to Information Handling Systems (IHSs), and, more specifically, to administration of IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be configured in a variety of manners. In some instances, an IHS may be configured through settings that alter the operation of software programs on the IHS, including the operating system of the IHS, applications that run within the operating system of the IHS and software programs that are external to the operating system of the IHS. In some instance, an IHS may also be configured through BIOS (Basic Input/Output System) settings. In some instances, an IHS may also be configured through firmware updates and settings that dictate the operation of hardware components, such as controllers and storage devices, of an IHS. In some instances, an IHS may be configured through register settings that alter the operation of hardware components, such as processors and FPGAs, of the IHS. In some instances, an IHS may be configured through the distribution of cryptographic credentials, such as certificates and passwords. Traditionally, such configurable settings of an IHS have been managed locally by a user of the IHS. More recently, management of IHSs has evolved to include remote management of such types of configurable settings of an IHS.

SUMMARY

In various embodiments, methods support configuration of settings of an Information Handling System (IHS). The methods may include: during factory provisioning of the IHS, generating an inventory of configurable settings of the IHS; during factory provisioning of the IHS, assigning permissions for configuration of a plurality of the configurable settings of the IHS to a configuration tool; during factory provisioning of the IHS, storing credentials to the IHS for authenticating communications from the assigned configuration tool; and allowing configuration of the plurality of the settings of the IHS by the assigned configuration tool when communications from the assigned configuration tool are validated against the credentials stored to the IHS during factory provisioning.

In some method embodiments, the configurable settings of the IHS comprise at least one of BIOS settings of the IHS, settings of an operating system of the IHS and settings of a hardware component of the IHS. In some method embodiments, the plurality of the settings comprise settings for a hardware component of the IHS and the assigned configuration tool is operated by a manufacturer of the IHS. In some method embodiments, the plurality of the settings comprise settings for a software application of the IHS and the assigned configuration tool is operated by a developer of the software application. In some method embodiments, the software application is an operating system of the IHS. In some method embodiments, during the factory provisioning, the credentials are stored to a trusted controller of the IHS. In some method embodiments, the external configuration tool communicates with the IHS via a workspace operating on the IHS. In some method embodiments, the workspace operates on the IHS according to a workspace definition that specifies the plurality of the settings assigned for configuration by the external communication tool. In some method embodiments, the configuration tool communicates with the IHS via a remote workspace orchestration service that supports a plurality of workspace operating on the IHS. In some method embodiments, the assigned configuration tool is operated by an entity providing technical support for the IHS on behalf of an owner of the IHS. In some method embodiments, the assigned configuration tool is operated by an owner of the IHS. Some method embodiments may further include modifying firmware of the IHS to reassign permissions for configuration of the plurality of the configurable settings of the IHS to a different configuration tool; and storing credentials to the IHS for authenticating communications from the different configuration tool.

In various additional embodiments, Information Handling Systems (IHSs) include a plurality of configurable settings, where the IHSs may include: a processor; a memory coupled to the processor, the memory having program instructions stored thereon that, upon execution, cause the processor to operate an operating system on the IHS; and a trusted controller having program instructions stored thereon that, upon execution, cause the trusted controller to: during factory provisioning of the IHS, assign permissions for configuration of a plurality of the configurable settings of the IHS to a configuration tool; during factory provisioning of the IHS, store credentials for authenticating communications from the assigned configuration tool; and allow configuration of the plurality of the settings of the IHS by the assigned configuration tool when communications from the assigned configuration tool are validated against the credentials stored to the IHS during factory provisioning.

In some IHS embodiments, the configurable settings of the IHS comprise at least one of BIOS settings of the IHS, settings of an operating system of the IHS and settings of a hardware component of the IHS. In some IHS embodiments, the plurality of the settings comprise settings for a hardware component of the IHS and the assigned configuration tool is operated by a manufacturer of the IHS. In some IHS embodiments, the plurality of the settings comprise settings for a software application of the IHS and the assigned configuration tool is operated by a developer of the software application. In some IHS embodiments, the assigned configuration tool is operated by an entity providing technical support for the IHS on behalf of an owner of the IHS.

In various additional embodiments, systems may include: a factory provisioning application configured to: during factory provisioning of an IHS, generate an inventory of configurable settings of the IHS; during factory provisioning of the IHS, assign permissions for configuration of a plurality of the configurable settings of the IHS to a configuration tool; and during factory provisioning of the IHS, store credentials to the IHS for authenticating communications from the assigned configuration tool. Systems may also include the IHS (Information Handling System) comprising a processor; and a memory coupled to the processor, the memory having program instructions stored thereon that, upon execution, cause the processor to allow configuration of the plurality of the settings of the IHS by the assigned configuration tool when communications from the assigned configuration tool are validated against the credentials stored to the IHS during factory provisioning.

In some system embodiments, the configurable settings of the IHS comprise at least one of BIOS settings of the IHS, settings of an operating system of the IHS and settings of a hardware component of the IHS. In some system embodiments, the plurality of the settings comprise settings for a hardware component of the IHS and the assigned configuration tool is operated by a manufacturer of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
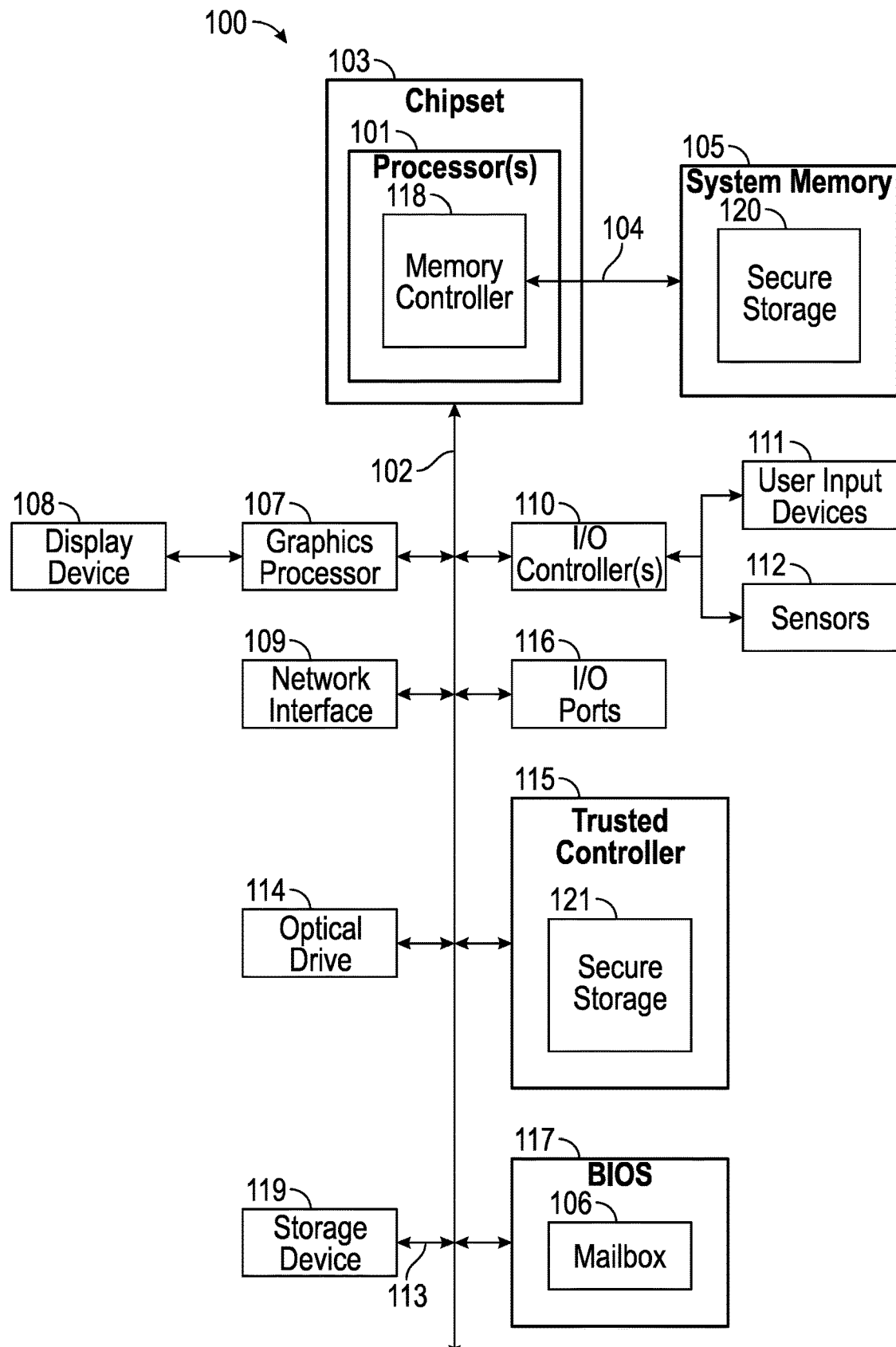
FIG. 1 is a diagram depicting illustrative components of an Information Handling System (IHS) configured, according to various embodiments, to support external management of settings of the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers used in remote orchestration of workspaces.

FIG. 1 is a diagram depicting illustrative components of an Information Handling System (IHS) configured, according to various embodiments, support external management of settings of the IHS 100. In some embodiments, IHS 100 may be employed to instantiate, manage, and/or terminate a workspace, such as a secure environment that may provide the user of IHS 100 with access to enterprise data while isolating the enterprise data from an Operating System (OS) and/or other applications executed by IHS 100. Workspaces may operate on an IHS 100 in various different configurations and may be dynamically assembled such that the computing architecture that is selected for the workspace is based on the observed security and productivity contexts in which the workspace will operate. As described in additional detail below, workspaces are configured for operation on an IHS 100 based on operations of a remote workspace orchestration service that may be formed from a layer of servers or other IHSs. A remote orchestrator of this service determines an appropriate workspace for providing access to a protected resource on an IHS 100 and for deploying the workspace on the IHS 100. As described in additional detail below, throughout the operation of the workspace on the IHS, the remote orchestration service provides ongoing support of the workspace on the IHS, including ensuring the IHS 100 continues to provide adequate protection and adequate productivity, as the context in which the IHS 100 operates changes throughout the ongoing use of the IHS.

IHS 100 may include a wide variety of configurable settings that may be used to customize or otherwise adapt the operation of the hardware and software of the IHS. As described, configurable settings of an IHS 100 were traditionally managed locally by a user of the IHS—in some cases by an administrator with elevated privileges allowing modification of certain settings. With the growth of wireless networks and portable IHSs, remote management of IHSs has become commonplace, thus leading to a proliferation in remote management of the configurable settings of an IHS. As part of the remote management of an IHS, remote administration of configurable settings of an IHS may be centrally managed through tools that remotely configure and maintain these configurable settings of the IHS. However, in many scenarios, remote management of configurable IHS settings by a single, central authority is inadequate. Instead, different types of configurable settings of an IHS may be advantageously managed by different entities. Supporting such remote administration of IHS settings results in security vulnerabilities and also results in scenarios where an IHS setting may be configured by multiple remote management tools, thus resulting in situations where conflicting settings may be applied by different remote management tools. In these situations, the application of conflicting settings may result in confusing and potentially unstable operation by the IHS, either due to certain configurations being overwritten by other remote management tools, or due to configuration attempts by remote management tools being disregarded by the IHS. Embodiments provide capabilities by which IHS 100 may be factory provisioned to support remote administration of configurable settings of the IHS in a manner that restricts configuration of individual IHS settings to a single remote management tool, while still supporting updates that allow configuration of an IHS setting to be reassigned for exclusive management by a different remote management tool.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104. In some embodiments, various aspects of the operation of processor 101 and/or memory controller 118 may be configured through modification of supported settings, such as firmware updates and registry settings.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In some embodiments, various aspects of the operation of system memory 105 may be configured through modification of supported settings, such as virtual memory settings.

In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS. In some embodiments, various aspects of the operation of network interface 109 may be configured through modification of supported settings, such as firmware updates and networking settings supported by a network controller.

Chipset 102 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102. In some embodiments, various aspects of the operation of display devices 108 and/or graphics processor 107 may be configured through modification of supported settings.

In certain embodiments, chipset 103 may utilize one or more I/O controllers 110 to access hardware components such as user input devices 111 and sensors 112. For instance, I/O controller 110 may provide access to user-input devices 111 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.). In some embodiments, various aspects of the operation of I/O controllers 110 may be configured through modification of supported settings, such as firmware settings supported by an photosensor.

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108. In some embodiments, various capabilities supported by sensor hub and/or sensors 112 may be configured through modification of supported settings.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100. In some embodiments, I/O ports may be enabled, disabled and otherwise configured through modification of supported settings.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109. In some embodiments, various aspects of the operation of storage device 119 may be configured through modification of supported settings and firmware updates.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In some embodiments, various BIOS 117 and/or UEFI settings may be configurable, thus modifying a wide variety of the aspects of the operation of IHS 100 and the hardware components of IHS described herein.

In the illustrated embodiment, BIOS 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, BIOS mailbox 106 may be utilized as a secure storage utilized by a remote orchestration service in order to store access policies and cryptographic keys for use in delivering and deploying a secured workspace on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service. In some embodiments, various aspects of the operation of trusted controller 115 may be configured through modification of supported settings.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via operations of a secure operating environment hosted by trusted controller 115 in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the secured storage 121 of trusted controller 115 may be utilized to store cryptographic information for use in authorization of workspaces. As described in additional detail below, embodiments may include factory provisioning of IHS 100 with credentials that may be stored by TPM and/or trusted controller 115 and utilized for authorization of external configuration tools in modifying configurable settings of IHS 100. In some instance, the external configuration tools may interface with IHS 100 via a workspace operating on the IHS or via a remote orchestration service that supports the operation of workspaces on the IHS. In some embodiments, such communications with external configuration tools may utilize the described out-of-band network connection supported by trusted controller 115.

In certain embodiments, trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature in order to determine if any modifications have been made to a component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature of trusted controller 115 and comparing it to a reference signature calculated during a trusted process for manufacture of IHS 100. In various embodiments, one or more of these operations supported by trusted controller 115 may be implemented using BIOS 117.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core functions of IHS 100, such as power management and management of certain operating modes of IHS 100 (e.g., turbo modes, maximum operating clock frequencies of certain components, etc.).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

Figure 2:
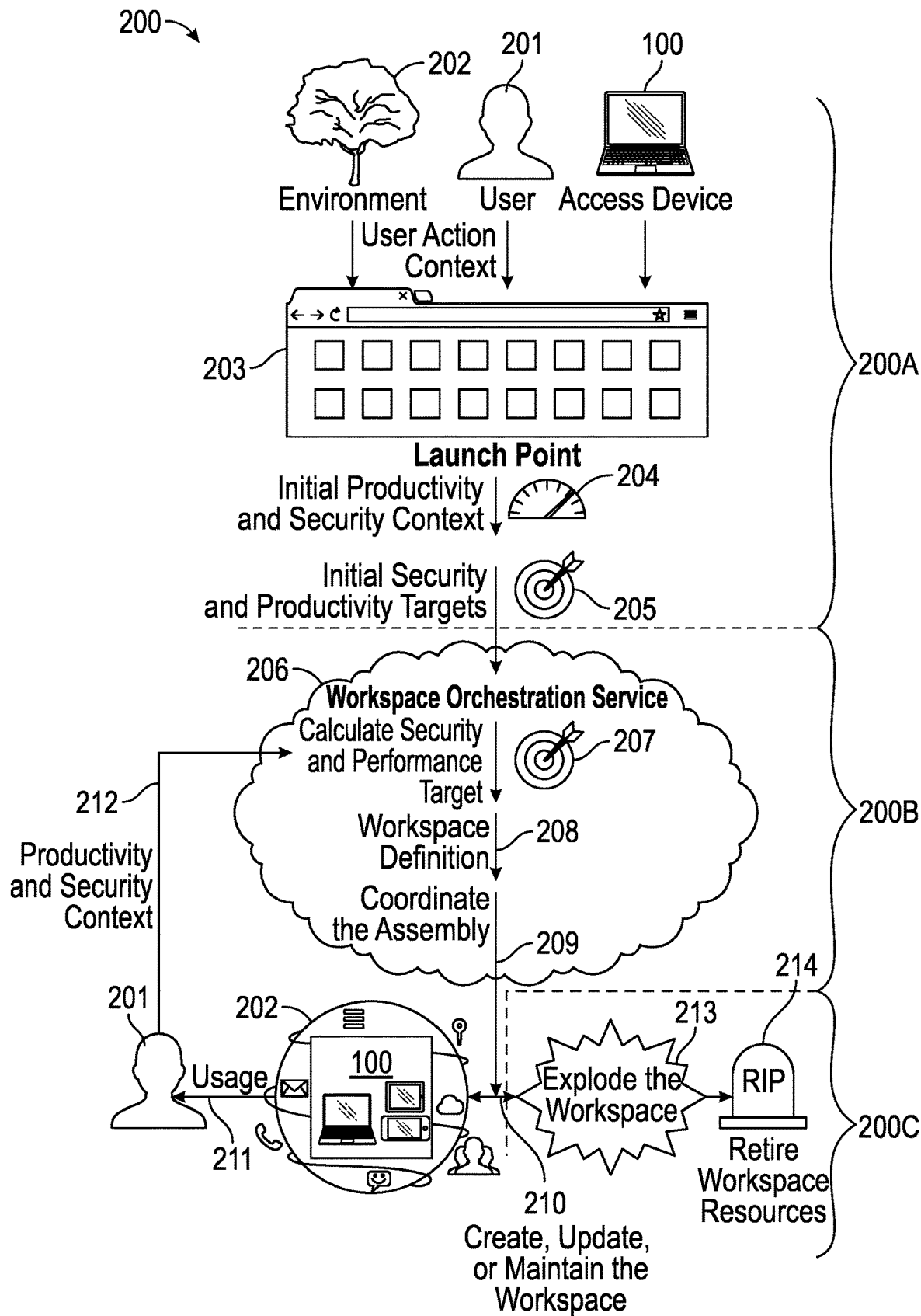
FIG. 2 is a diagram depicting a system and procedure for deploying and maintaining workspaces operating on an IHS, where the system is configured, according to various embodiments, to support external management of settings of the IHS.

FIG. 2 is a diagram depicting an example of method 200 for configuring, deploying and providing ongoing support for a dynamic workspace in an enterprise productivity ecosystem in a manner that supports external management of settings of an IHS. For sake of illustration, method 200 has been split into three phases: workspace initialization phase 200A, workspace orchestration phase 200B, and workspace termination phase 200C. During initialization 200A, user 201 (e.g., an enterprise user) operates an IHS 100 (e.g., a desktop, a laptop, a tablet, a smart phone, etc.) such as described with regard to FIG. 1 within physical environment 202 (e.g., any type of environment and its associated context, including physical location, geographic location, location within a particular facility or building, detected networks, time of day, proximity of the user, individuals in the vicinity of IHS 100, etc.).

Method 200 starts with an action by user 201 at a launch point 203 that may be, for example, a corporate launch point provided by an employer of user 201, a launch point 203 provided by the manufacturer of IHS 100, or a launch point provided as a service to user 201 by a third-party. Particularly, user 201 operates IHS 100 to access launch point 203 that is provided, for example, in the form of a web portal, a portal application running in the OS of IHS 100, a special-purpose portal workspace operating on IHS 100, or the like. In various implementations, launch point 203 may include Graphical User Interface (GUI) elements representing different software applications, data sources and/or other resources that the user may desire to execute and/or manipulate. In various embodiments, launch point may provide a graphical, textual and/or audio interface by which data or other resource may be requested by a user 201. As such, authenticated user 201 may be provided a launch point that provides visibility as to one or more software applications and an aggregation of user's data sources available across all of their datastores (e.g., local storage, cloud storage, etc.). As described in additional detail below, workspaces for providing user 201 with access to requested data or other resources may operate using a local management agent 332 that operates on IHS 100 and is configured to interoperate with workspace orchestration service 206.

In various embodiments, launch point 203 may be provided in the form of a portal (e.g., a webpage, OS application or special purpose workspace) that allows user 201 to request access to managed resources. In various embodiments, launch point 203 may be hosted by remote workspace orchestration service 206, local management agent 332 on IHS 100, or any suitable combination thereof. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source managed by workspace orchestration service 206. In response to an access request issued by user 201 (e.g., the user selects an icon of launch point 203), local management agent 332 of IHS 100 collects initial security and productivity context information at 204. For example, security context information may include attributes indicating a security risk associated with: the data and/or application being requested, a level of risk presented by the user 201, the hardware utilized by IHS 100, the logical environment of IHS 100 in which a workspace will be deployed to provide access to the requested data and/or application, and the physical environment 202 in which IHS 100 is currently located.

Accordingly, in this disclosure, the term "security context" generally refers to data or other information related to a security posture in which a workspace will be deployed and utilized, where the security posture may be based on the user, IHS 100, data to be accessed via the workspace, and/or environment 202. A security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

For example, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the OS and other applications in use on IHS 100, availability of encryption, type of available encryption, access to secured storage, use of attestable hardware by IHS 100, supported degree of workspace isolation by IHS 100, etc.

The term "productivity context" generally refers to user productivity associated with a workspace, user, IHS, or environment. A "productivity score" generally refers to an index usable to score, quantify, or measure various productivity characteristics of a productivity context. Examples of productivity context information include, but are not limited to: the hardware of the IHS, the software of the IHS, including the OS, power states and maximum clock frequencies of selected components of the IHS, peripheral devices coupled to the IHS, either permanently or temporarily, networks available to the IHS and the performance characteristics of those networks, software installers available on the IHS, etc.

Initial productivity and security targets for a workspace may be calculated based on the context of user's 201 actions combined with the productivity and security context in which the workspace will operate. The productivity and security targets may also be based on user's 201 behavioral analytics, IHS 100 telemetry and/or environmental information (e.g., collected via sensors 112). In some cases, at 205, a local management agent operating on IHS 100 may calculate initial security and productivity targets based upon the collected security and productivity context. In other cases, remote workspace orchestration service 206 may calculate security and productivity targets.

As used herein, the term "security target" generally refers to the attack surface presented by a workspace that is created and operated based on a workspace definition, while the term "productivity target" generally refers to the productivity characteristics of a particular workspace definition.

Examples of a productivity target include, but are not limited to: type of data or data source available to user 201, minimum latency of a workspace, etc. Conversely, attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces, the ability to extend a workspace, etc.

Moreover, the term "workspace definition" generally refers to a collection of attributes that describe aspects a workspace that may be assembled, created, and deployed in a manner that satisfies a security target (i.e., the definition presents an attack surface that presents an acceptable level of risk) and a productivity target (e.g., data access, access requirements, upper limits on latency, etc.) in light of the security context (e.g., location, patch level, threat information, network connectivity, etc.) and the productivity context (e.g., available device type and performance, network speed, etc.) in which the workspace is to be deployed. A workspace definition may enable fluidity of migration of an instantiated workspace, since the definition supports the ability for a workspace to be assembled on any target OS or IHS that is configured for operation with the workspace orchestration service 206.

In describing capabilities and constraints of a workspace, a workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that can be executed in the defined containment of the workspace to enable user 201 to be productive with one or more data sources, additional applications that enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources; etc. In some embodiments, the workspace definition 208 selected for operation of a workspace may specify a computing architecture for use in the operation of the workspace.

In some implementations, workspace definitions may be based at least in part on static policies or rules defined, for example, by an enterprise's Information Technology (IT) Decision Maker (ITDM). In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during orchestration 200B, the initial security and productivity targets are processed and/or reconciled against resources, device capabilities, and cloud services available, etc., to produce a workspace definition at 208. In some embodiments, a workspace definition 208 may specify one or more software resources from which a workspace may operate. The workspace definition 208 may also specify various capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), etc. In some embodiments, the workspace definition 208 may also specify a remote orchestrator that is authorized to administer or otherwise manage the operations of the workspace once it has been deployed. In addition or in alternative, in some embodiments, the workspace definition 208 may specify settings of IHS 100 that may be configured via the workspace, and may specify the configuration tool to which management of the configurable settings in the workspace definition have been assigned. In such embodiments, the workspace definition may also include credentials presented by the external entity utilizing the workspace for external configuration of settings of the IHS. In such scenarios, a workspace may serve as a configuration tool by which external entities may configure settings of the IHS.

The initial workspace definition may then be utilized by automation engine 302 of workspace orchestration service 206 to coordinate assembly 209 and instantiation 210 of a workspace using a selected computing architecture of the IHS 100 in which the workspace will operate. In particular, the automation engine 302 may assemble a set of software resources for use by the workspace. For instance, in cases where a workspace is to be partly cloud-hosted, automation engine 302 may assemble a workspace that specifies one or more resources to support the local operations on the IHS 100, such as a web-based container, and one or more resources that interface with the cloud hosted portion of the workspace. In some embodiments, automation engine 302 may receive inputs from a human administrator in selecting the containers for use by a workspace.

Once the workspace has been deployed according to its workspace definition, the instantiated workspace is operated by user 201 at 211, and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if an instantiated workspace has parameters that fall outside of the range of the target indexes such that a difference between updated context information and the previous context information is scored below a threshold value, automation engine 302 may process the assembly of modifications to an existing workspace and deploy such modifications at 210. Conversely, if the difference between the updated context information and the previous context information is scored above a threshold value, automation engine 302 may generate a new workspace at 210. Session data metadata and context may be preserved by data aggregation engine 336, and session data may be restored as applicable.

Additionally, or alternatively, method 200 may terminate or retire the initial or previous workspace at 213, as part of termination phase 200C. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or workspace orchestration service 206 may be released. In some embodiments, this workspace lifecycle may be administered by remote orchestrators that are part of the remote orchestration service 206.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining appropriate level of security. In some cases, the definition of a productivity environment and access requirements may be selected based upon productivity and security dependencies and targets, and the definition of capabilities related to the workspace may be adaptive in nature. Particularly, workspace definition attributes, including the software resources selected for use by the workspace, may be dynamically selected based upon historical productivity and security information, based upon each individual user or group's behavior.

Figure 3A:
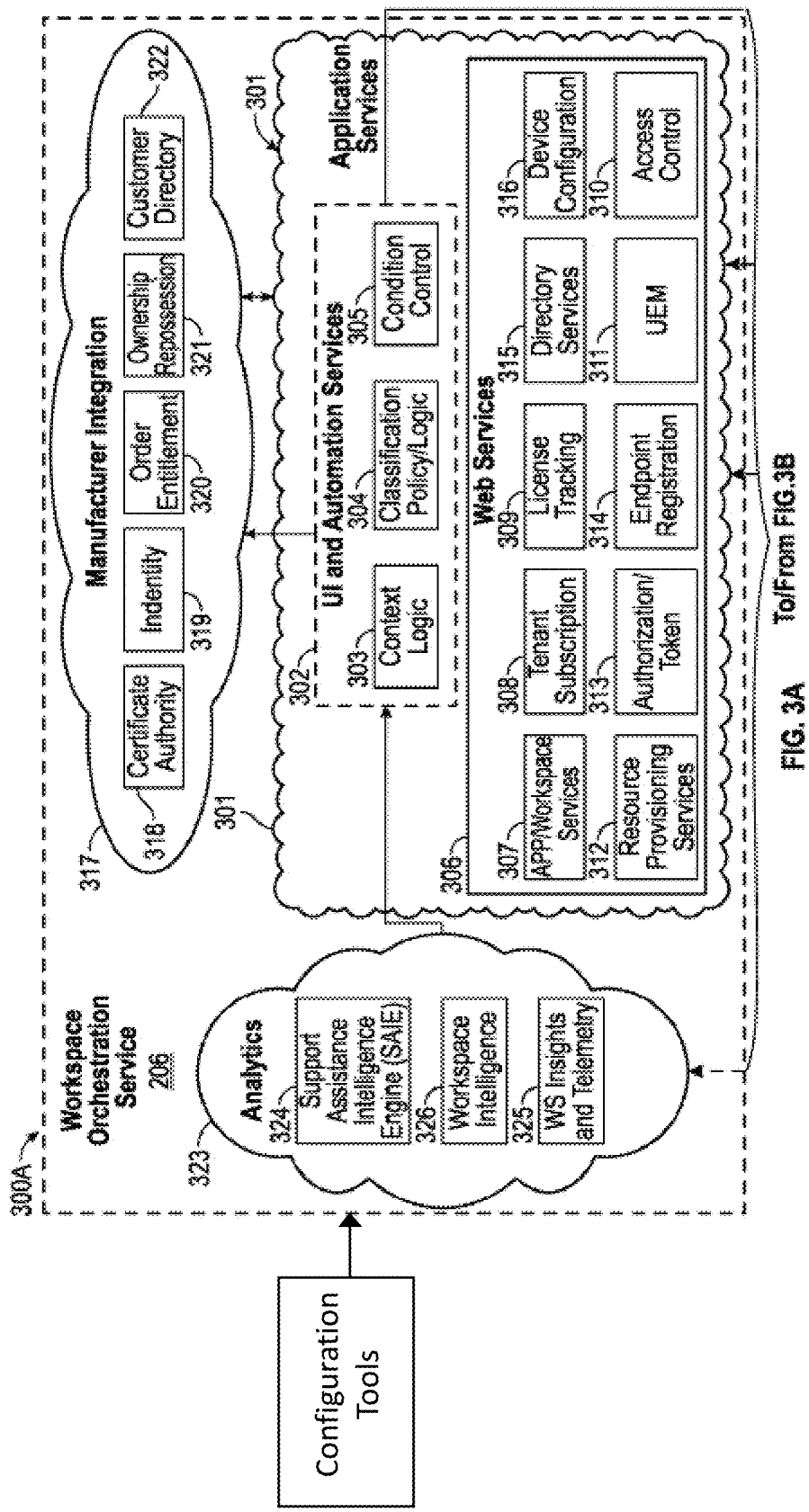
FIGS. 3A and 3B are a diagram depicting an example of a system configured for deploying and maintaining workspaces operating on an IHS, where the system is configured, according to various embodiments, to support external management of settings of the IHS.
Figure 3B:
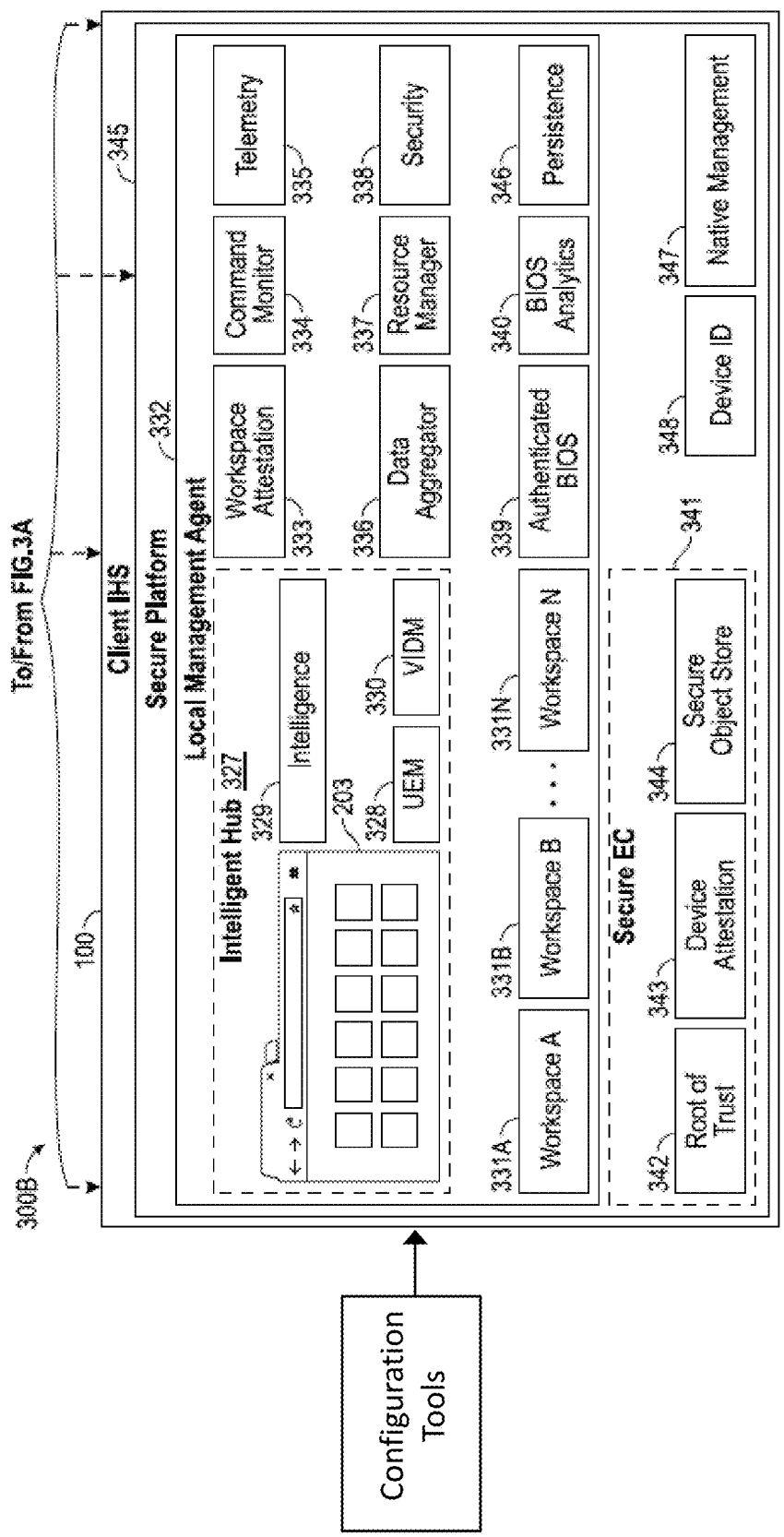

FIGS. 3A and 3B show a diagram of an example of system components 300A and 300B (collectively referred to as "system 300") that support workspace lifecycle management in an enterprise productivity ecosystem in a manner that supports external management of settings of the an 100. Particularly, system 300 may include one or more servers, or other IHSs, remotely located and/or networked having program instructions stored thereon that, upon execution, cause the one or more servers to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100. System 300 may include program instructions that, upon execution, cause IHS 100 to perform various local management operations described herein, including, but not limited to, the collection of productivity and security context information, the calculation of productivity scores and/or risk scores, the instantiation, execution, and modification of a workspace based upon files, definitions, or policies, such as workspace definitions. As described in additional detail below, the components of the workspace orchestration service 206 may include tools that provide external management of configurable settings of IHS100, either by interfacing directly with IHS 100 and/or through the operation of a workspace on IHS 100. In some embodiments, the workspace orchestration service 206 may include orchestrators that support the remote management of configurable settings of large numbers of IHSs configured such as IHS 100. These orchestrators may provide such remote management functions for a specific entity, such as the manufacturer of the IHS or entities providing technical support for the IHS or certain components of the IHS, such as its operating system or certain hardware components.

Components 300A and 300B of system 300 may be coupled to and/or in communication with each other via any suitable network technology and/or protocol, which allows workspace orchestration service 206 to be operated remotely with respect to local management agent 332, and thus IHS 100. As described with regard to FIG. 1, an IHS according to embodiments may include a component such as a trusted controller that may support certain secure out-of-band communications that are independent from the OS of IHS 100. In some embodiments, such a trusted controller may be configured to support deployment and operation of local management agent 332 and/or to report changes in context to workspace orchestration service 206. In some embodiments, capabilities of a trusted controller of IHS 100 may be utilized by the workspace orchestration service 206 in validating the integrity of the software resource in use by an IHS in the operation of a workspace.

As illustrated in system component 300A of FIG. 3A, workspace orchestration service 206 may include a number of sub-components that support deployment and ongoing evaluation and adaptation of workspaces on IHS 100. Embodiments of workspace orchestration service 206 may include systems that may support: web services 306, manufacturer integration 317, and analytics 323. Moreover, web services 306 may comprise application services 301 and user interface (UI) and automation services 302.

Analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence module 326 may include any suitable intelligence engine for processing and evaluating context data in order to identify patterns and tendencies in the operation of workspaces and in the adaptation of workspaces based on context changes.

Application services 306 system of workspace orchestration service 206 includes UI and automation services 302 system that may include context logic or engine 303, classification policy 304, and condition control module or engine 305. Context logic or engine 303 may support processing of context information in making risk assessments (e.g., evaluating the risk associated requests by the user against the context of the user's behavior, history of the user's IHS, capabilities of the user's IHS, and environmental conditions). For instance, security context information collected by IHS 100 may be provided to workspace orchestration service 206 where it may be used, such as by context logic 303, to calculate a risk score associated with a request for use of a managed data source and/or application. Classification policy 304 may include administrator and machine-learning defined policies describing risk classifications associated with different security contexts, such as risk classifications for specific data, locations, environments, IHSs, logical environments, or user actions (e.g., use of high-risk data requires use of a workspace definition suitable for use with a risk score above a specific value). Condition control module or engine 305 may include intelligence providing automated decision making for appropriately aligning risk and context. In some cases, condition control module or engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score. For example, in response to a detected increase in the risk score associated with a workspace deployment, embodiments may support redeployment of the workspace using a different set of software resources, thus altering the architecture of the workspace in a manner that implements additional security procedures.

Application services 301 may include a group of web services 306 called on by UI and automation services 302 to support various aspects of the orchestration of workspaces. Particularly, web services 306 may include application and workspace services 307 that may assemble and package containers or other software resources for deployment by a workspace (e.g., an ".msix" file packaged and deployed to a MICROSOFT HYPER-V container). In some embodiments, a workspace definition may be used to specify whether a user will be provided access to an application in this manner. Web services 306 may also include a tenant subscription module 308, that performs dynamic configuration of an IHS and deployment of the described workspace orchestration services at the point-of-sale (POS) of an IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned as part of a trusted assembly process of IHS 100 and, in some instances, associated with a unique identifier 348 of the IHS 100. Web services 306 may also include an authorization/token module that provides identity functions and may connect to various authentication sources, such as, for example, Active Directory. Endpoint registration module 314 may be configured to register IHSs and/or workspaces with management service that tracks the use of the described workspace orchestration. In some scenarios, a directory services 315 module may be configured to provide active directory services (e.g., AZURE ACTIVE DIRECTORY from MICROSOFT). Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration.

Still referring to FIG. 3A, manufacturer integration components 317 may communicate with application services 301 and client IHS 100 to provide features that are usable during workspace evaluation and instantiation, where these features are based upon information available to the manufacturer of client IHS 100. For instance, certificate authority 318 may include an entity that issues digital certificates that may be used in validating the authenticity and integrity of the hardware of IHS 100 and/or of the workspace definition generated by the orchestration service 206. Identity service module or engine 319 may be configured to manage the user's or owner's identity as well as brokering identification for use of customer directory 322. Order entitlement module or engine 320 may be responsible for managing the entitlements purchased as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 100 of FIG. 3B, in some embodiments, IHS 100 may be configured to operate local management agent 332 that may run within a secure execution environment 345 hosted by trusted controller 341, such as trusted controller 115 of FIG. 1. In other embodiments, local management agent 332 may operate as a trusted and attestable process of the OS of IHS 100. In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating. Accordingly, the workload(s) in each of workspaces 331A-N may be hosted in a public cloud, a private cloud, a specific server, or locally hosted in full or in part on IHS 100, depending on the context in which the workspace is operating. These allocations of computing resources that comprise the computing architecture for each particular workspace 331A-N may be individually prescribed by the respective workspace definition that is used to build and operate each workspace. As described, the workspace definition may be created by workspace orchestration service 206 based upon context information provided by IHS 100, security targets for each workspace 331A-N, and productivity targets for each workspace 331A-N. As described in additional detail below, in some embodiments, the workspace orchestration service 206 may interoperate with local management agent 332 in management of workspaces operating on the IHS, where a specific orchestrator of the service 206 may be authorized to administer the workspace.

In some embodiments, local management agent 332 may be configured to host, launch, and/or execute a workspace hub 327 that provides a launch point 203 by which users may initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein. In various embodiments, the launch point 203 may be provided in the form for textual, graphical and/or audio user interfaces that allow a user of IHS 100 to select available data and/or resources. In some embodiments, workspace hub 327 may utilize a local environment management module 328 in providing the workspace interface that is presented to the user on IHS 100 and doing so in a consistent manner across workspaces 331A-N. Workspace hub 327 may also include a local intelligence logic or engine 329 used to support modeling the use of IHS 100 in order to improve characterization of the actual risk associated with a risk context. User authentication and access control operations may be performed by a local identity module 330 that may interface with trusted controller 341 in providing user authentication.

In some cases, each instantiated workspace 331A-N may be an environment that provides a user with access to requested data or applications, where the environment may operate using a computing architecture that may be isolated in varying degrees from the hardware and software of IHS 100 based on the security context and productivity context in which each workspace 331A-N is operating. In some instances, the selection of a data source or resource that are available to user via launch point 203 may result in launching a new workspace. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for access to the confidential presentation). In other instances, a selection of the presentation file by a user may result in the presentation being made available through the existing workspace, in some cases using the existing workspace definition and, in other cases, using a workspace definition that has been modified to support the requested access to the confidential presentation file. In some embodiments, such modifications may be implemented through modifications to the software resources that are available for use by the workspace.

Although workspaces 331A-N supported by IHS 330B may each be isolated to varying degrees from the hardware and/or software of IHS 100 and from each other, a user of IHS 330B may expect to be able to operate the multiple workspaces 331A-N in a manner that allows content to be transferred between the different workspaces 331A-N. For instance, a user may select a portion of the data displayed in workspace 331A and utilize OS or other workspace functions to copy the data for copying to workspace 331B. In some embodiments, such capabilities may be enabled based on the software resources that are available for use by the workspace In various embodiments, local management agent 332 may operate in full or in part on secure platform 345 hosted by trusted controller 341, such as described with regard to FIG. 1, that operates independent from the OS of IHS 100.

In some embodiments, all or part of local management agent 332 may operate as trusted components of the OS of IHS 100. To execute the various operations described herein, local management agent 332 may include command monitor 334 configured to provide instrumentation to receive commands from workspace orchestration service 206 in support of the workspaces operating on the IHS. For instance, such commands supported by local management agent 332 may provide for a workspace definition to be specified for an individual workspace 331A-N. In some embodiments, such commands supported by local management agent 332 may further support transfer of control of remote orchestration of a workspace operating on the IHS and may further support validation of an orchestrator as an authorized administrator of a particular workspace. Local management agent 332 may also include telemetry module 335 that may be configured for communicating collected information to workspace orchestration service 206, including reporting changes in context that may warrant adjustments to workspaces 331A-N. Data aggregator 336 may track all of the data source and other resources (e.g., applications, local or cloud-based services) that may be provided to the user via a workspace.

Local management agent 332 may utilize resource manager module 337 that is configured to manage access to data, network configuration, such as for VPNs and network access, identity information, access control, and resource provisioning services. Security module 338 may be configured to provide various security service, including interfacing with a TPM of the IHS in order to determine whether credentials presented by a remote orchestrator correspond to credentials that identify the authorized administrators of the workspace. BIOS interface 339 may provide a secure BIOS interface used for accessing and managing credentials in secure object storage. In some embodiments, BIOS interface 339 may support modification of configurable BIOS settings by a workspace operating on the IHS, such as described in additional detail below. BIOS analytics module 340 may be configured to perform forensic services for BIOS telemetry and health assessments. Persistence module 346 may be configured to support persistence of applications entitled at a POS or assigned by administrators and supported with required license tracking. Workspace attestation module 333 may provide a platform centric service layer on top of a container engine provided by local management agent 332 and may be used to measure and attest workspaces 331A-N in any suitable manner defined or orchestrated by condition control module 305. In some embodiments, workspace attestation module 333 may support validation of the integrity of software resources specified in a workspace definition.

As part of secure platform 345, native management module 347 may be configured to enable an out-of-band management interface for interoperation with workspace orchestration service 206, where this OOB interface operates independent form the OS of IHS 100. In some embodiments, the OOB management interface supported by native management module 347 may be utilized by the device configuration services 316 of the workspace orchestration service to access the secure platform services 345 of IHS 100. For instance, in some embodiments, the OOB interface may be utilized by the remote orchestration service in interfacing with trusted components of the IHS, such as the trusted controller and/or the TPM of IHS 100.

Digital device ID module 348 may provide a unique, un-spoofable, cryptographically bound identifier. In embodiments supporting a secure platform 345, secure embedded controller 341 may be a hardened hardware module that may include a root of trust module 342 configured as a trusted data store and, in some cases for cryptographic processing, that may be trusted within a cryptographic system. A device attestation service 343 may be configured to perform device assurance and trust services (e.g., secure BIOS and secure boot, etc.). A secure object store 344 may be provided that is configured to lock and access keys, hashes, and/or other secrets in an EC and/or TPM.

In some scenarios, IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how the systems and methods described herein operate to modernize workspace and hardware lifecycle management in an enterprise productivity ecosystem, three non-limiting use cases or examples are discussed in turn below.

Use Case A

In use case A, a given user may request access to a protected data source on the enterprise's premise using a corporate-owned and imaged notebook computer, which may be configured as described with regard to IHS 100 of FIG. 1 and client IHS 100 of FIG. 3B.

In response to the request, a local management agent 332 operating on the user's notebook retrieves information describing the context and calculates security and productivity targets based on the determined context information. In this use case, the local management agent may have been installed by an IT administrator, and it may be running in the background as a service. When the user selects the protected data, such as via a selection via the OS of the notebook, the local management agent notifies the workspace orchestration service of the request and for a workspace definition for a workspace by which the user may be provided access to the protected data. The confidential data may be associated with the local management agent on the IHS, based on file classification (e.g., file metadata/type/properties/permissions, folder location, encrypted region, etc.). The local management agent may continuously collect context information and send it to the orchestration service for use in scoring the risk and productivity of the workspace (this may also be done at the time of the user's access request or indication of intent).

In this example, the workspace orchestration service may score an overall security risk to have a value of "2," using a weighed, machine learning, or artificial intelligence algorithm, based upon the following risk context information or inputs, each of which may be a risk metric selected based upon a policy: locale (e.g., a safe locale with a risk score of 1); user persona (e.g., a high-confidence in a sophisticated user classification—a user whom historically does not click on phishing emails with a risk score of 1); network risk (e.g., a low risk score of 1 based on use of a wired network connection); IHS risk (e.g., a risk score of 1 based on a high level of control because of corporate owned/managed platform using known software versions with security features enabled); regulatory risk (e.g., a risk score of 1 based on user, data, location combinations—e.g., No restrictions with respect to General Data Protection Regulation or "GDPR," Health Insurance Portability and Accountability Act "HIPAA," Payment Card Industry "PCI," technology export, etc.); and data type risk (e.g., a risk score of 8 based on a confidential datafile being requested).

The workspace orchestration service may also calculate a productivity score to have a value of "9," using a weighed, machine learning, or artificial intelligence algorithm, based upon the following context information or inputs, each of which is also given as a resource metric based upon a selected policy: locale: 10 (office); user persona: 9 (a "skilled" classification based upon advanced compute tasks, proficiency, and/or speed); network speed/latency: 10 (fast, wired, Gigabit Ethernet, or direct to internal network); device performance: 8 (fast, expensive CPU, memory, graphics, but storage only needs—e.g., <10 GB); and data type: 10 (the local, confidential file is easy to read/write with low latency and high performance on local storage).

Second, based upon the security score and/or context information, the workspace orchestration service builds a workspace definition file having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, non-multifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local file-system encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, the workspace orchestration service and the local management agent may give the user access to the requested local confidential file, and the user may begin working in a newly created workspace.

Use-Case B

In use-case B, a user may request access to a confidential datafile while at a coffee shop using an open public network and an IT-managed/owned PC, such configured as described with regard to IHS 100 of FIG. 1 and client IHS 100 of FIG. 3B.

First, a local management agent 332 executed by client IHS 100 retrieves the requested context and calculates security and productivity scores based on context. In this use-case, the local management agent may have been installed by IT, and it may be running in the background as a service. The confidential data may be kept on a shared IT-managed network resource on-premises (e.g., back in a main corporate office), and the local management agent may be responsible for monitoring when this data path is requested by the user (e.g., the user hits a specific URL, IP, etc.). Moreover, the local management agent may continuously collect all context and send it to the workspace orchestration service to assist in scoring processes later (this may also be done at the time of the user's access request or indication of intent, rather than a continuous collection).

When the user selects the desired confidential datafile, client IHS 100's OS calls the local management agent associated with the path to the confidential datafile and calls back to a remote workspace orchestration service 206 to request a workspace definition.

In this example, the workspace orchestration service may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

The workspace orchestration service may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high—worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of 7 (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application—preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, the workspace orchestration service and the local management agent may give the user access to the requested local confidential file, and the user may begin working in a newly created workspace.

Use-Case C

In use-case C, a user may request access to a confidential datafile in a web hosted remote portal using a browser from Kazakhstan, while at an internet café with a borrowed/rented PC, such configured as described with regard to IHS 100 of FIG. 1 and client IHS 100 of FIG. 3B, on an open Wi-Fi network.

First, a remote workspace orchestration service 332 intercepts the access request and evaluates the browser and user context, and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to the workspace orchestration service to request a workspace definition.

In this example, the workspace orchestration service may score an overall security risk to have a value of 9, using a weighed, machine learning, or artificial intelligence algorithm, based upon the following context information or inputs, each of which is also scored as a risk metric based upon a selected policy: locale (e.g., a risk score of 9 for operation of the IHS in Kazakhstan); user persona: 1 (user was expected to be there, the timing seems right based upon past logins, and he has a biometric watch communicator proving he is alive, himself, and located where he says he is—so that IT can always trust him); network risk: 9 (high, public and in a very obscure place); device risk: 9 (zero trust); and regulatory: 8 (based on user, data, location combinations).

The workspace orchestration service may also calculate a productivity score to have a value of 5, using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification—advanced compute tasks, proficiency, and speed); network speed/latency: 3 (low quality—Wireless G from a long way away); and device performance: 3 (have to be able to tolerably browse web pages but based on what the service believes the capabilities will be, the service should build simple ones).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch—session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, the workspace orchestration service and remote cloud web portal (e.g., session the user logged into through the browser) may assemble the workspace and instantiate it for the user in the browser. For example, the web portal may receive definition files (e.g., JSON, XML, etc.) from the orchestration service, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled—user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations—do not allow anything except bitmap renderings through the enforceable network); network integrity: 4; memory confidentiality: 9 (web page viewer only—no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality—prompt user at least—adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate). After confirming the configuration, the workspace orchestration service and the local management agent may give the user access to the requested rendered data, and the user may begin working in a newly created workspace.

Figure 4:
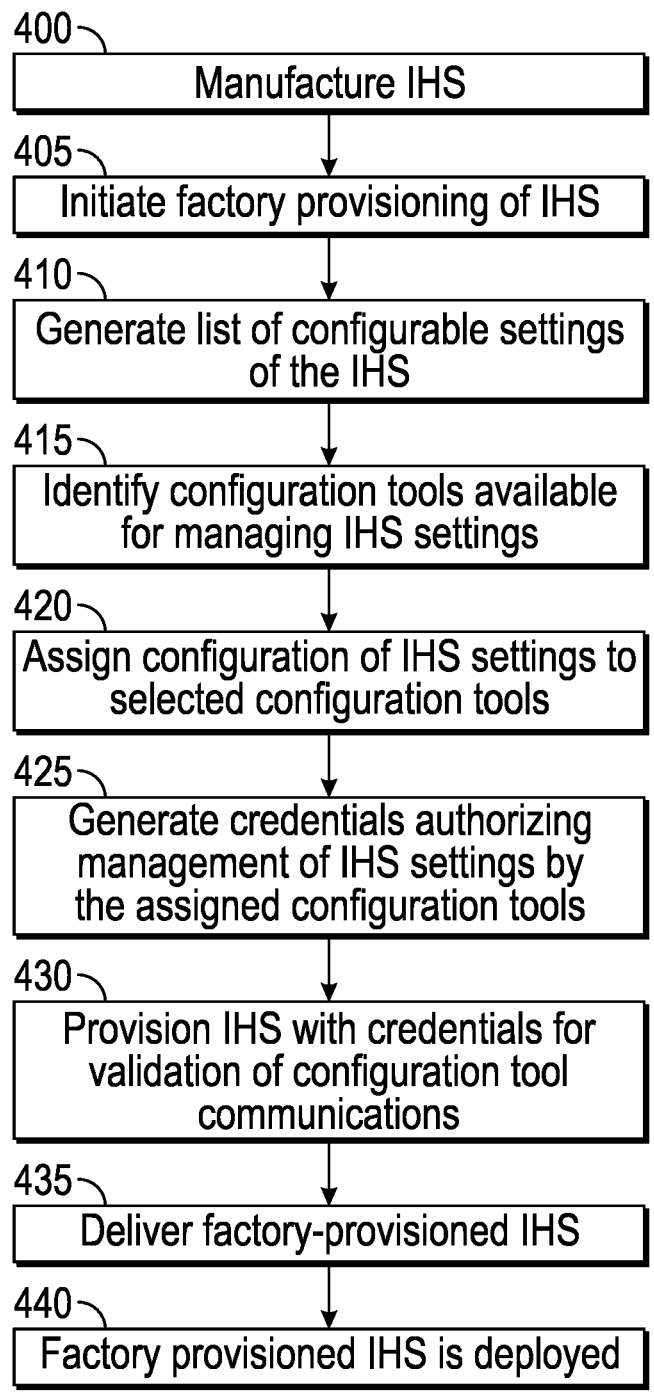
FIG. 4 is a flowchart diagram depicting certain steps of a method according to embodiments to support external management of settings of an IHS.

FIG. 4 is a flowchart diagram depicting certain steps of a method for external management of settings of the IHS. Some embodiments of the method of FIG. 4 may begin, at block 400, with the factory assembly of an IHS, such as the manufacture and assembly of an IHS such as described with regard to FIGS. 1 and 3B. In some instances, an IHS may be manufactured using a factory process that includes multiple phases of assembly, validation and provisioning that must be completed before the IHS is supplied to a customer. In some instances, an IHS, such as a rack-mounted server, may be purpose-built for a particular customer such that the IHS is assembled and provisioned according to specifications provided by the customer. The initial factory assembly of an IHS may include the selection of a chassis and the fastening of various hardware components to the selected chassis. Such a factory assembly process may include generating a manifest that tracks the individual hardware components that are installed in an IHS. In some instances, a manifest of configurable settings of each of the individual hardware components that have been installed may also be generated by such a factory assembly process. As described above, the installed hardware components may include standard components and may also include specialized components that have been requested by a specific customer that has contracted for the assembly and delivery of an IHS. As such, a manifest may specify a custom configuration of hardware components installed in an IHS based on instructions provided by a customer, or a manifest may specify a standard set of components that are installed in the particular IHS model that has been assembled. In some instances, specialized components requested by a customer may be separately managed once the IHS is delivered and deployed. Embodiments support external management of the configurable settings of an IHS, where different settings may be exclusively managed by external configuration tools. Accordingly, such specialized components of an IHS may be remotely and exclusively managed through the embodiments described herein.

Once the assembly of an IHS has been completed, the IHS may be subjected to manual and automated inspections that confirm the IHS has been properly assembled and does not include any defects. After confirming an IHS has been assembled without any manufacturing defects, at block 405, factory provisioning of the IHS may be initiated. In some instances, the provisioning of an IHS at the factory may include various stages that may include stages for loading of firmware, configuring hardware components, and installing an operating system and other software. Various aspects of this factory provisioning process may be conducted using a factory provisioning application, where this factory provisioning application may run on one or more servers and may interface with an IHS that is being provisioned once a requisite amount of firmware and software has been installed to the IHS.

In some instances, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. As described, this manifest may be generated from a custom hardware configuration assembled according to customer instructions, or may be generated from a standard hardware configuration for the model or other product designation of the IHS. Once the software of an IHS has been installed and configured, the manifest of configurable settings of the installed hardware may be augmented, at 410, to include the configurable settings of the installed software of the IHS. In one illustrative example, such a manifest of software settings may include BIOS settings of the IHS, settings supported by firmware of individual hardware components of the IHS, security software settings, such as a firewall and antivirus software, settings supported by the operating system of the IHS as well as security settings that may be supported by components such as the trusted controller, processor and TPM components described with regard to FIG. 1.

At block 415, a manifest including an inventory of the configurable hardware and software settings is provided to the factory provisioning application that is used to provision the assembled IHS. Based on the provided inventory of configurable settings of the IHS, the factory provisioning application may initiate procedures for selecting external configuration tools that are authorized as the entity with exclusive control over the configuration of each of the configurable settings of the IHS for which the procedures described herein will be supported. Some or all of these configurable settings of the IHS may be configured with initial default values during factory provisioning of the IHS. Embodiments support further configuration of these settings once the IHS has been deployed, where such further configuration of these settings may be made by external entities that have been designated as the sole authorities with regard to configuration of these settings. In some instances, the factory provisioning application may assign an authority with permission to configure each of these settings of the IHS. For instance, settings that configure the operation of a specific hardware component may be designated for configuration by the manufacturer of that specific component, or by an entity providing ongoing support for that hardware component. In other instances, settings supported by the operating system of the IHS may be assigned in full or in part to the developer of the operating system, while also supporting these settings supported by the operating system to be divided among any number of external configuration tools for management. In other instances, some settings may be reserved for configuration by the manufacturer of the IHS, while other settings may be assigned for configuration by the customer for which the IHS is being factory provisioned.

Accordingly, at 415, the factory provisioning application identifies the configuration tools that will serve as authorities over each of the configurable settings of the IHS. In some instances, the factory provisioning application may be provided with a listing of configurable IHS settings that will be managed by specific configuration tools, with all remaining settings that have not been assigned being reserved for configuration by tools of the manufacturer of the IHS. In some instances, the factory provisioning application may be provided credentials for some or all of the configuration tools to which configurable settings will be assigned. For instance, a manufacturer of a specific component, such as a network controller, of an IHS may provide credentials for use in remote management of configurable settings of the network controller. In this same manner, the developer of the operating system may provide credentials for use in management of some or all of the settings of the operating system. Based on the provided information, at 420, the factory provisioning application assigns a configuration tool for administration of each of the configurable settings of the IHS. Once completed, each of the configurable settings of the IHS has been mapped to a configuration tool.

As described, in some instances, the factory provisioning application may be provided credentials for some of the configuration tools. In other instances, the factory provisioning application may rely on cryptographic capabilities of the factory system. For example, as described above, a remote orchestration service may include a certificate authority that may interface with a HSM (Hardware Security Module) in generating cryptographic credentials. In some embodiments, such factory capabilities may be utilized by the factory provisioning application, at 425, to generate credentials for some or all of the configuration tools that have been assigned as authorities with permission for configuring settings of the IHS.

Still as part of the factory provisioning of the IHS, at 430, the IHS is provisioned with the credentials for use in authenticating the configuration tools that have been assigned as authorities over configurable settings of the IHS. As described with regard to FIGS. 1, an IHS may include a trusted controller that provides capabilities for remote management of an IHS, where these remote management capabilities may include out-of-band remote management of various hardware components of an IHS. In some embodiments, at 430, the factory provisioning application interfaces with a trusted controller in provisioning credentials to the IHS for use in authorizing management of the configurable settings of the IHS by a configuration tool that is in possession of the same credential, or a credential that can be validated using the factory-provisioned credential. As described with regard to FIG. 1, a trusted controller of an IHS, in some instances through capabilities supported by a TPM, may support cryptographic capabilities that operate within the root of trust of the IHS and that include the ability to store cryptographic credentials and to validate the authenticity and/or integrity of presented information based on these credentials. Accordingly, in some embodiments, the provisioning of the credentials for external management of IHS settings may result in storage of these credentials by the TPM of the IHS.

Once the IHS has been factory provisioned with credentials for external management and once any additional factory provisioning of the IHS has been completed, at 435, the IHS is delivered to a customer. As described, in some scenarios, an IHS may be assembled and provisioned according to specifications provided by a specific customer. In such instances, the factory provisioning of the IHS for external management of configurable settings may be conducted according to specifications provided by a customer, where some or all of the configurable settings may be assigned for configuration by a configuration tool of the customer. Once the provisioned IHS has been delivered, at 440, the IHS is deployed by the customer and put into service.

Figure 5:
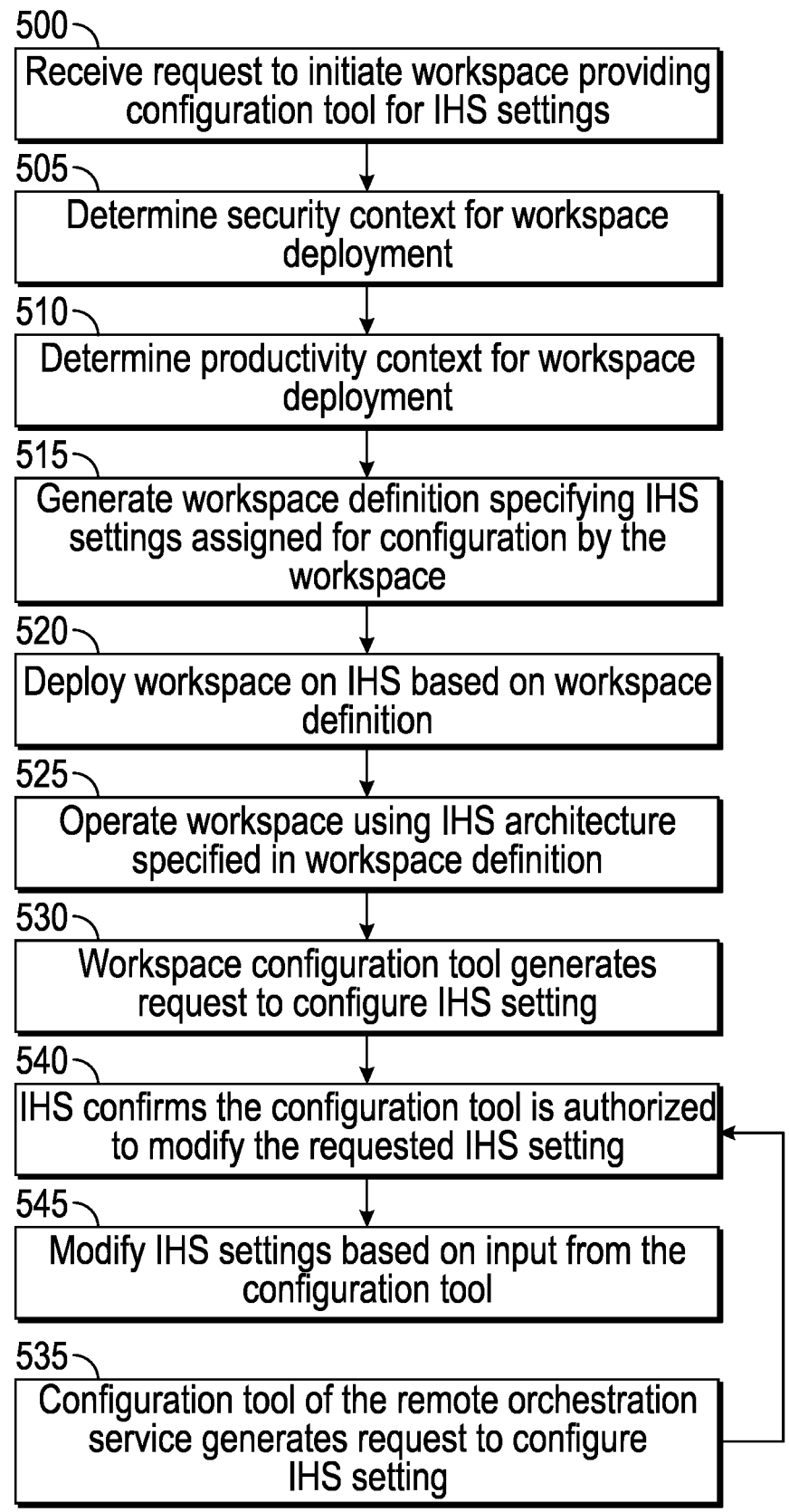
FIG. 5 is a flowchart diagram depicting certain steps of an additional method according to embodiments to support external management of settings of an IHS.

FIG. 5 is a flowchart diagram depicting certain steps of an additional method according to embodiments to support external management of settings of an IHS. Some embodiments may begin, at 500, with the receipt of a request for initiation of a workspace on the IHS, where the workspace includes tools for the configuration of IHS settings. As described above, a workspace may be launched on an IHS in response to a user selection provided by a launch point supported by a local management agent of the IHS. In other instance, a workspace may be launched on an IHS by a remote orchestration service, such as in response to a notification of a request to modify configurable settings of the IHS by an external configuration tool. For example, the remote orchestration service may initiate a workspace on the IHS in response to a request for configuration of IHS settings by an authority, such as the developer of the operating system of the IHS, to which the configuration of one or more settings has been assigned.

In response to request for initiation of a workspace, at 505, the security context for the requested workspace deployment may be determined. As described above, a local management agent of the IHS may collect various types of information describing a security context for a workspace deployment on an IHS. For instance, the local management agent may collect information describing the user, the authentication status of the user, the security profile for the user, the geographic location of the IHS, whether other individuals are detected in proximity to the IHS, the network in use by the IHS, the operating system of the IHS, authentication capabilities supported by the IHS, antivirus software in use by the IHS, whether the software in use by the IHS has been validated as authentic, etc. As described, these various types of security context information may then be used to calculate a security score for the workspace deployment. In a similar manner, at 510, the productivity context for the workspace deployment may also be determined. As described above, the productivity context may include various productivity characteristics for a workspace deployment on an IHS, such as performance specifications of the IHS, capabilities of the networks in use of the IHS, peripheral devices of the IHS that are available for use, productivity tools (e.g., speech recognition software) supported by the IHS, etc. As with the collected security context information, the productivity context may be used to generate a productivity score for the workspace deployment.

As described above, based on the security score and the productivity score for the workspace deployment, at 515, a workspace definition may be generated by the remote workspace orchestration service, where the workspace definition may specify various types of information used to deploy and operate the workspace on the IHS. For instance, the workspace definition may specify a computing architecture for use in the operation of the workspace. For example, the workspace request may be associated with elevated security score due to the request seeking to configure settings of the IHS, thus requiring affirmative validation of the entity requesting the workspace. In response to the elevated security score, embodiments may specify a computing architecture that implements elevated security procedures, such as requiring biometric authentication of the user of the IHS. As described, in scenarios where a workspace is being generated for use as a configuration tool for managing IHS settings, the workspace definition for the workspace may specify the IHS settings that have been assigned for configuration using the workspace.

At 520, the workspace is deployed on the IHS based on the workspace definition generated by the remote orchestrator. With the workspace deployed in this manner, at 525, the user may operate the workspace through ongoing support provided by the remote orchestrator service, as described above. In instances where the workspace is configured to operate as a configuration tool for IHS settings, at 530, the workspace generates a request to configure any portion of the settings of the IHS. In some instances, the workspace may initiate such a request through an API supported by the described local management agent that supports the operation of workspace on the IHS. In other instances, the workspace may initiate such a request through an API supported by a trusted controller of the IHS, such as the trusted controller described with regard to FIG. 1. Through such APIs, the workspace issues a request to configure a setting of the IHS, with the workspace presenting credentials by which to authenticate the workspace as a configuration tool that is authorized to make the requested configuration setting.

As indicated in FIG. 5, at 535, requests for management of IHS settings may additionally or alternatively be received from the workspace orchestration service. As described, external configuration tools that are granted authority to manage IHS settings my operate via workspaces, or as components of a remote orchestration service. For instance, some settings of the IHS may be reserved for management by the manufacturer of the IHS, either by design or by no other authority having been assigned to manage these settings. In such instances, the manufacturer of the IHS may operate an orchestrator within that orchestration service that is configured to manage settings of the IHS. In some instances, an entity that is providing ongoing technical support for the IHS may similarly operate an orchestrator that is configured to manage settings of the IHS. In some instances, remote orchestrators that manage settings of the IHS may communicate configuration requests to the IHS via the out-of-band management connections supported by the trusted controller described with regard to FIG. 1. Using these out-of-band communication channels, a remote orchestrator may access the described APIs of the local management agent and/or trusted controller of the IHS in issuing requests to modify IHS settings.

At 540, a received requests for configuring one or more IHS settings is validated. In some instances, such a request may be received by a management process operating on a trusted controller, in some cases using firmware that has its integrity validated based on signatures stored to the IHS during factory provisioning, such as described with regard to FIG. 1. As described with regard to FIG. 4, during factory provisioning of the IHS, credentials may be stored to the IHS for use in validating requests for configuration of IHS settings by external configuration tools. In some embodiments, these credentials may be stored by a TPM of the IHS. In other embodiments, these credentials may be stored by the described trusted controller of the IHS. Upon receipt of a request for configuration of an IHS setting, the described firmware of the trusted controller determines whether the credentials presented by the configuration tool in the request correspond to the factory provisioned credentials for that particular IHS settings, in some cases through capabilities supported by the TPM. For example, in instances where the factory provisioned credentials include a cryptographic key or certificate, communications from a configuration tool will validated as being authentic when these credentials may be successfully used to decrypt a digital signature provided by the configuration tool in its request to modify IHS settings. In addition, based on the presented credential, the IHS determines whether the configuration tool is authorized to make the modification to the specific settings specified in the request. If the credentials presented by the configuration tool are validated as corresponding to an authentic configuration tool and the authenticated configuration tool has been assigned authority to make the requested configuration modification, at 545, the IHS makes the requested modification to the IHS setting.

In this manner, any portion of the configuration settings of an IHS may be assigned for confirmation to an external configuration tool, with management of each configuration setting being assigned for exclusive management by a single external configuration tool. Through factory provisioning of the IHS to support external management of IHS settings, embodiments support secure management of IHS settings by external configuration tools. Embodiments also support reassignment of the configuration tool with authority for managing specific IHS settings. In such scenarios, updates to the firmware utilized by the trusted controller in evaluating received requests for modifying IHS settings. For example, upon an owner of the IHS contracting for ongoing technical support of the IHS by a new entity, firmware utilized by the trusted controller may be updated to specify a configuration tool of this new entity as being assigned for remote management of some or all of the IHS settings, with the assignment of the prior configuration tool deleted or overwritten and credentials provided for validating communications for the new entity.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for supporting configuration of settings of an Information Handling System (IHS), the method comprising:
    during factory provisioning of the IHS, generating an inventory of configurable settings of the IHS;
    during factory provisioning of the IHS, assigning permissions for configuration of a plurality of the configurable settings of the IHS to a configuration tool;
    during factory provisioning of the IHS, storing credentials to the IHS for authenticating communications from the configuration tool; and
    allowing configuration of the plurality of the configurable settings of the IHS by the configuration tool when communications from the configuration tool are validated against the credentials stored to the IHS during factory provisioning.

2. The method of claim 1, wherein the configurable settings of the IHS comprise at least one of BIOS settings of the IHS, settings of an operating system of the IHS and settings of a hardware component of the IHS.

3. The method of claim 1, wherein the plurality of the configurable settings comprise settings for a hardware component of the IHS and the configuration tool is operated by a manufacturer of the IHS.

4. The method of claim 1, wherein the plurality of the configurable settings comprise settings for a software application of the IHS and the configuration tool is operated by a developer of the software application.

5. The method of claim 4, wherein the software application is an operating system of the IHS.

6. The method of claim 1, wherein, during the factory provisioning, the credentials are stored to a trusted controller of the IHS.

7. The method of claim 1, wherein the configuration tool communicates with the IHS via a workspace operating on the IHS.

8. The method of claim 7, wherein the workspace operates on the IHS according to a workspace definition that specifies the plurality of the settings assigned for configuration by the configuration tool.

9. The method of claim 1, wherein the configuration tool communicates with the IHS via a remote workspace orchestration service that supports a plurality of workspaces operating on the IHS.

10. The method of claim 1, wherein the configuration tool is operated by an entity providing technical support for the IHS on behalf of an owner of the IHS.

11. The method of claim 1, wherein the configuration tool is operated by an owner of the IHS.

12. The method of claim 1, further comprising:
    modifying firmware of the IHS to reassign permissions for configuration of the plurality of the configurable settings of the IHS to a different configuration tool; and
    storing credentials to the IHS for authenticating communications from the different configuration tool.

13. An Information Handling System (IHS) with a plurality of configurable settings, the IHS comprising:
    a processor;
    a memory coupled to the processor, the memory having program instructions stored thereon that, upon execution, cause the processor to operate an operating system on the IHS; and
    a trusted controller having program instructions stored thereon that, upon execution, cause the trusted controller to:
        during factory provisioning of the IHS, assign permissions for configuration of a plurality of the configurable settings of the IHS to a configuration tool;
        during factory provisioning of the IHS, store credentials for authenticating communications from the configuration tool; and
        allow configuration of the plurality of the configurable settings of the IHS by the configuration tool when communications from the configuration tool are validated against the credentials stored to the IHS during factory provisioning.

14. The IHS of claim 13, wherein the configurable settings of the IHS comprise at least one of BIOS settings of the IHS, settings of an operating system of the IHS and settings of a hardware component of the IHS.

15. The IHS of claim 13, wherein the plurality of the configurable settings comprise settings for a hardware component of the IHS and the configuration tool is operated by a manufacturer of the IHS.

16. The IHS of claim 13, wherein the plurality of the configurable settings comprise settings for a software application of the IHS and the configuration tool is operated by a developer of the software application.

17. The IHS of claim 13, wherein the configuration tool is operated by an entity providing technical support for the IHS on behalf of an owner of the IHS.

18. A system comprising:
    a factory provisioning application configured to:
        during factory provisioning of an IHS, generate an inventory of configurable settings of the IHS;
        during factory provisioning of the IHS, assign permissions for configuration of a plurality of the configurable settings of the IHS to a configuration tool; and during factory provisioning of the IHS, store credentials to the IHS for authenticating communications from the configuration tool; and the IHS (Information Handling System) comprising:
   a processor; and
   a memory coupled to the processor, the memory having program instructions stored thereon that, upon execution, cause the processor to allow configuration of the plurality of the configurable settings of the IHS by the configuration tool when communications from the configuration tool are validated against the credentials stored to the IHS during factory provisioning.

19. The system of claim 18, wherein the configurable settings of the IHS comprise at least one of BIOS settings of the IHS, settings of an operating system of the IHS and settings of a hardware component of the IHS.

20. The system of claim 18, wherein the plurality of the configurable settings comprise settings for a hardware component of the IHS and the configuration tool is operated by a manufacturer of the IHS.

\* \* \* \* \*